Feb. 7, 1967  R. W. FLENTGE  3,303,445
SOLENOID CONSTRUCTION
Filed March 18, 1965  2 Sheets-Sheet 1
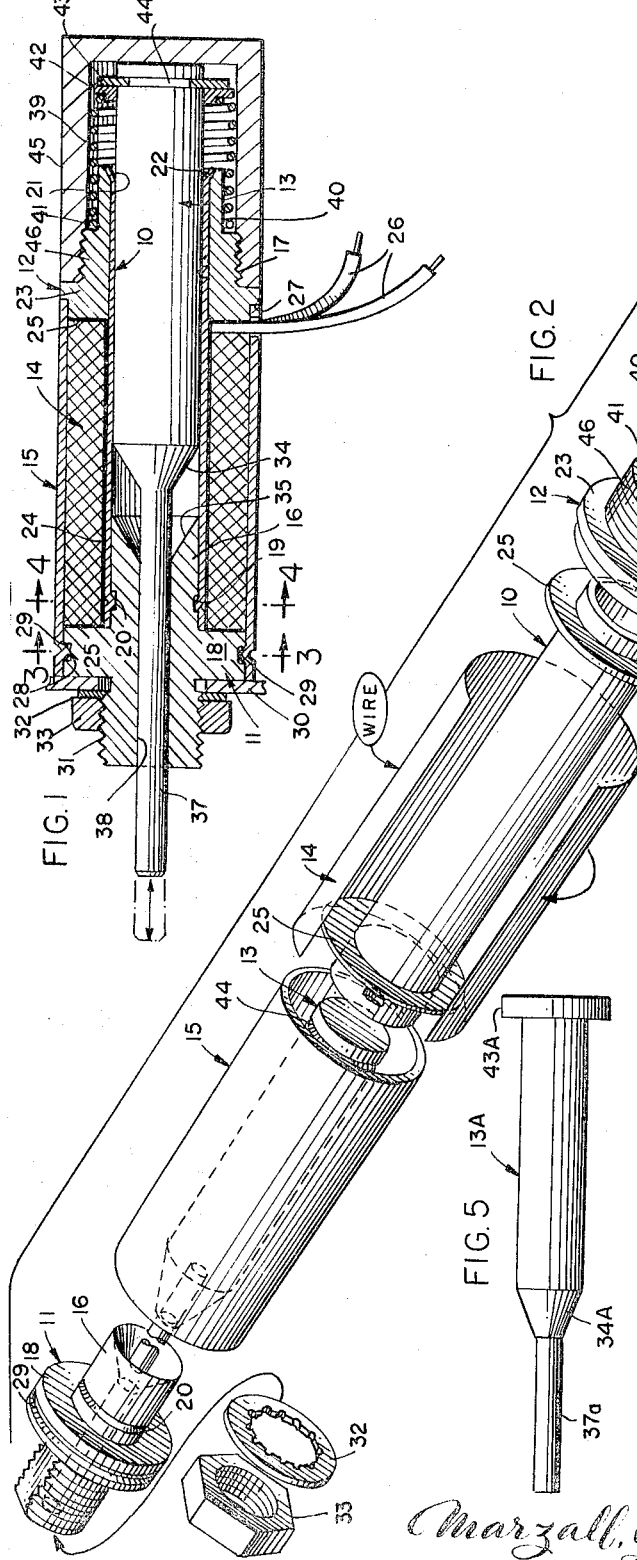
INVENTOR:
ROBERT W. FLENTGE
BY
Marzall, Johnston, Cook & Root
ATT'YS

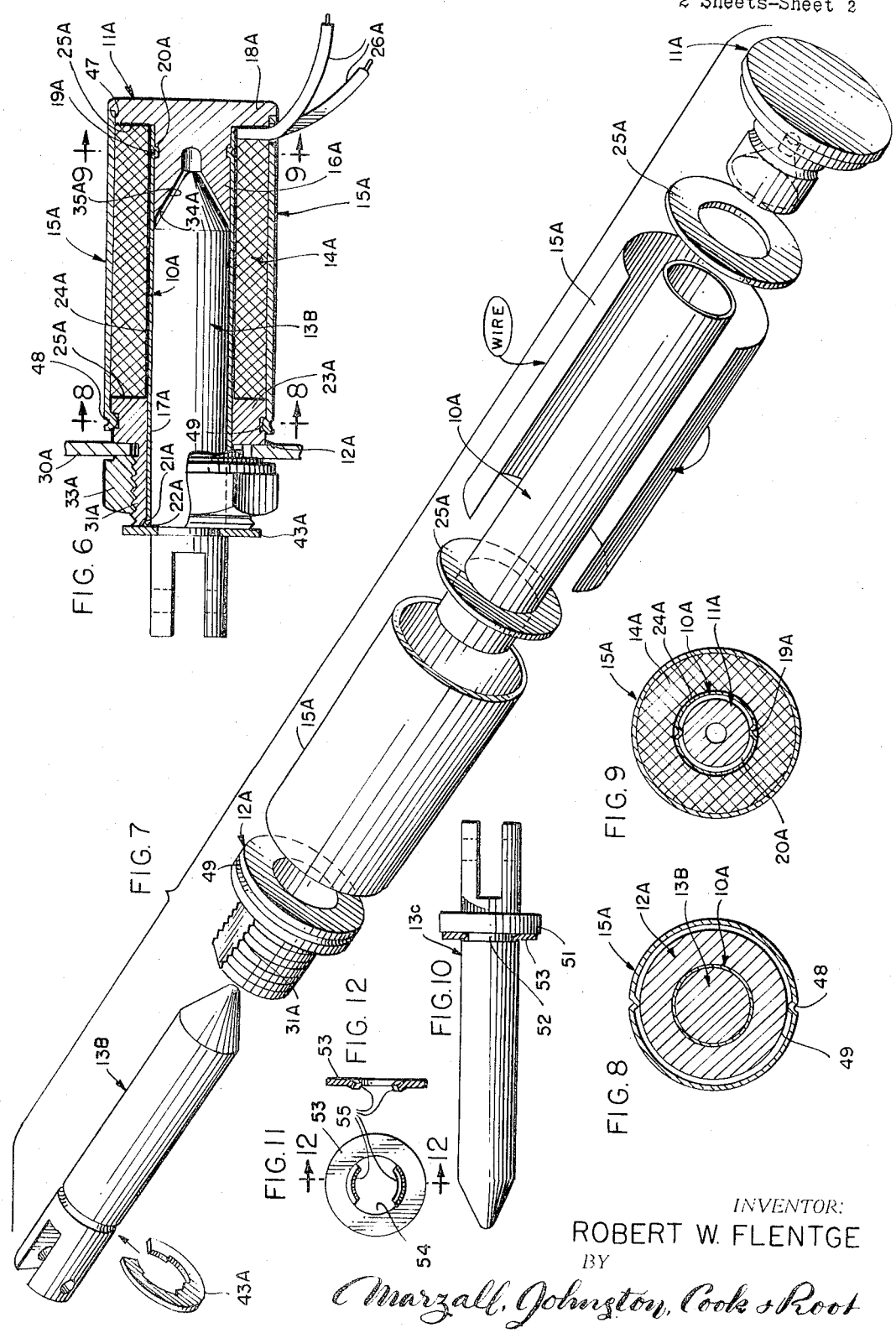

United States Patent Office 3,303,445
Patented Feb. 7, 1967

3,303,445
SOLENOID CONSTRUCTION
Robert W. Flentge, Roselle, Ill., assignor to
Albert F. Dormeyer, Chicago, Ill.
Filed Mar. 18, 1965, Ser. No. 440,826
9 Claims. (Cl. 335—255)

This invention relates in general to a solenoid, and more particularly to a solenoid having a particular construction and size so that it is adaptable for long life operation on computers and the like, although other uses and purposes may be apparent to one skilled in the art.

Heretofore, solenoids that have been developed for long life operation in computers and the like have been extremely costly and difficult to manufacture due to the component parts and costly techniques of assembly.

Accordingly, it is an object of the present invention to provide a solenoid that will obviate the above identified difficulties, and provide a unit capable of extremely long life operation and consisting of a minimum number of parts that may be quickly and inexpensively assembled.

A further object of the present invention resides in the provision of a new and improved solenoid that is capable of being operated with a relatively light weight spring for withdrawing the plunger from the coil.

A still further object of this invention resides in the provision of a solenoid having a minimal amount of residual magnetism existing between the plunger and the plug when the plunger is in seated position, thereby permitting a smaller force to withdraw the plunger from the coil.

Another object of this invention is in the provision of a solenoid having means on the plunger preventing the plunger from bottoming against the plug of the solenoid, and thereby enhancing the overall life of the unit.

Other objects, features, and advantages of the invention will be apparent from the following detailed disclosure, taken in conjunction with the accompanying sheets of drawings, wherein like reference numerals refer to like parts, in which:

FIG. 1 is an axial sectional view taken through a solenoid according to the invention and illustrating the plunger in withdrawn position and wherein the solenoid is a push-type;

FIG. 2 is an exploded perspective view of the solenoid of FIG. 1;

FIG. 3 is a transverse sectional view taken substantially along line 3—3 of FIG. 1;

FIG. 4 is a transverse sectional view taken substantially along line 4—4 of FIG. 1;

FIG. 5 is a plan view of a modified plunger for use in the solenoid of FIGS. 1-4;

FIG. 6 is an axial sectional view taken through a further embodiment of the invention and illustrating the invention as a pull-type solenoid;

FIG. 7 is an exploded perspective view of the solenoid of FIG. 6;

FIG. 8 is a transverse sectional view taken along line 8—8 of FIG. 6;

FIG. 9 is a transverse sectional view taken substantially along line 9—9 of FIG. 6;

FIG. 10 is a plan view of a modified plunger and residual washer for use in the solenoid of FIGS. 6-9;

FIG. 11 is a front view of the residual washer for the plunger of FIG. 10; and

FIG. 12 is a vertical sectional view taken substantially along line 12—12 of FIG. 11.

Referring now to the drawings, and particularly to FIGS. 1-4, a push-type solenoid according to the present invention is illustrated, and generally includes a coil tube 10 of non-magnetic material, a plug 11 of magnetic material, a face plate 12 of magnetic material, a plunger 13 of magnetic material, a coil 14, and a cover 15 of magnetic material.

The coil tube 10 is in the form of a cylindrical sleeve, and is telescopically received at one end over a projecting portion 16 of the plug 11, and at the other end is telescopically received within a bore 17 extending through the face plate 12. At the end engaging the plug 11, the free end of the tube 10 abuts against a radial flange 18 formed on the plug. In assembled relationship, the coil tube 10 is staked at 19 to the cylindrical portion 16 of the plug 11. In order to facilitate the staking operation, an annular groove 20 is provided on the cylindrical portion 16 of the plug 11. It will be appreciated that the tube may be staked any number of times about the cylindrical portion 16 so long as the tube is then essentially connected to the plug.

The face plate 12 is provided with an annular relieved portion 21 so that the outer end of the coil tube 10 adjacent thereto can be flared at 22 to prevent movement of the face plate 12 off the coil tube 10. Moreover, the outer end of the face plate 12 is substantially flush with the end of the coil tube flared portion 22. A radial flange 23 is formed on the face plate 12 and coacts with the plug flange 18 and the coil tube 10 to define a bobbin for the coil 14. Prior to winding of the coil 14, an insulating tape 24 is wrapped around the coil tube between the flanges, and insulating washers 25 are arranged against the facing surfaces of the flanges.

After the coil 14 is in place and the leads 26 properly extended from the solenoid, the cover 15 is slipped over the plug 11 and the coil and in abutting relationship with a shoulder 27 formed on the face plate 12. Thereafter, the cover is staked at 28 to the radial flange 18 of the plug 11. To facilitate the staking operation, an annular groove 29 is formed in the outer peripheral surface of the radial flange 18, and it may be appreciated that the cover may be staked any number of times to properly connect it to the plug. It may also be noted that the end of the cover at the plug is preferably in alignment with the outer face of the radial flange 18 so that it will abut against a mounting plate, such as that indicated by the numeral 30, upon which the solenoid is supported. To further support the solenoid on the mounting plate, a threaded portion 31 extends from the radial flange 18 and receives thereon a washer 32 and a nut 33 that tightly lock the solenoid to the mounting plate 30.

One end of the plunger 13 is provided with a conical surface 34 of similar contour as a conical recess 35 provided in the end of the cylindrical portion 16 of the plug 11. This solenoid being a push-type solenoid is provided with a push pin 37 suitably secured in the end of the plunger 13 facing the plug 11. The push pin 37 is slidably guided in a bore 38 provided axially through the plug 11, and it can be appreciated that the push pin 37 may thereafter suitably engage a member to be actuated by the solenoid. The push pin is suitably press-fitted into an opening formed in the end of the main portion of the plunger.

A spring 39 is provided to withdraw the plunger 13 from seated position when the solenoid is de-energized. This coil spring 39 is telescopically received over an end portion 40 of the face plate and bottomed against a shoulder 41 at one end, and bottomed against a collar 42 at the other end that is held from movement off the end of the plunger 13 by a retaining ring 43. The collar 42 and the retaining ring 43 are of non-magnetic material. The ring 43 may be a conventional "E" ring lockable in an annular groove 44 formed at the end of the plunger 13. The parts within the solenoid are such that when the plunger 13 is in seated position, the conical surface 34 will be in slightly spaced relation from the conical recess 35 of the plug, thereby defining an air gap between the plunger and the plug when the plunger is in seated position. Such an air gap reduces the residual magnetism and enables a smaller force to withdraw the plunger 13 when the solenoid is de-energized. Moreover, when the plunger 13 is in seated position, the collar 42 will engage against the end of the face plate 12, whereby closing of the solenoid will cause the closing forces to be transmitted to the face plate 12 through the casing or cover 15 and directly to the mounting plate 30 thereby avoiding any damaging to the solenoid caused by the forces set up when the solenoid reaches seated position. For if the plunger is seated against the plug 11, the continued hammering forces of the plunger would ultimately weaken the connection between the coil tube and the plug and ultimately cause failure of the solenoid.

A cap of non-magnetic material 45 is provided for protecting the spring end of the solenoid and for serving as a plunger stop when the solenoid is de-energized. The cap is threadedly received on a threaded portion 46 of the face plate 12.

A modified plunger 13A, FIG. 5, may be substituted for the plunger 13. This plunger differs from the plunger 13 in that it is made in one piece, such as being machined from a solid bar. A radial flange 43A is provided at the outer end which takes the place of the washer 43. In operation, the collar 42 would abut against the flange 43A. Otherwise, this plunger would operate like the plunger 13.

Referring to the embodiment of FIGS. 6–9, the present invention is illustrated as a pull-type solenoid and primarily differs from the embodiment of FIGS. 1–4 in that the plunger applies a pulling force to a member to be actuated rather than a pushing force. Moreover, the embodiment of FIGS. 6–9 depends upon an outside spring to cause withdrawal of the plunger from the coil. Inasmuch as many of the parts are quite similar, some of the same numbers with added letters will be employed for identifying the parts.

The solenoid of FIGS. 6–9 includes generally a coil tube 10A of non-magnetic material, a plug 11A of magnetic material, a face plate 12A of magnetic material, a plunger 13B of magnetic material, a coil 14A having leads 26A, and a cover or casing 15A.

The plug 11A includes a cylindrical portion 16A telescopically receiving thereover one end of the coil tube 10A, and a radial flange 18A against which one end of the tube abuts. Staking 19A is provided in alignment with an annular groove 20A on the cylindrical portion 16A of the plug to secure the coil tube 10A to the plug.

The face plate 12A includes a bore 17A enabling the face plate to be telescoped over the other end of the coil tube 10A. An annular relieved portion 21A receives a flared portion 22A of the tube to prevent the face plate 12A from movement off the tube.

Insulating tape 24A and insulating washers 25A insulate the coil winding 14A from the coil tube, plug and face plate. And a radial flange 23A is provided on the face plate 12A to coact with the radial flange 18A of the plug 11A and the coil tube to define the bobbin for the coil 14A.

A shoulder 47 is formed on the plug 11A to receive thereagainst one end of the cover or casing member 15A, while the other end is staked at 48 to the radial flange 23A of the face plate 12A. In order to facilitate the staking operation, an annular groove 49 is provided in the outer surface of the radial flange 23A.

The inner end of the plunger 13B is conically formed at 34A, while the inner end of the plug 11A is provided with a conical recess 35A. A non-magnetic seating ring 43A is mounted on the plunger 13B to seat the plunger in energized position so that the conical end 34A is slightly spaced from the conical recess 35A thereby defining an air gap therebetween. Such reduces the residual magnetism and allows a spring of smaller force to withdraw the plunger from the solenoid. Moreover, the seating ring 43A transmits the closing forces of the solenoid 13B directly to the mounting plate 30A, thereby avoiding hammering of the plug 11A and ultimately the failure of the solenoid. A suitable mounting nut 33A is threadedly received on a portion 31A of the face plate to lock the solenoid in position on the mounting plate 30A. While the cover 15A is shown staked to the face plate 12A, it should be appreciated that it could be staked only to the plug 11A.

The modified plunger and seating ring arrangement of FIGS. 10–12 may be substituted for the plunger 13B and ring 43A. This plunger generally designated by the numeral 13C includes a radial flange 51 at the outer bifurcated end integral with the body of the plunger, and an annular slot 52 adjacent thereto on the side toward the inner end of the plunger for receiving a residual washer 53. This washer has an opening 54 sized slightly greater than the main body of the plunger over which it must move to be positioned at the groove or slot 52, and inwardly extending detents 55 that angularly extend from the plane of the washer and enable it to be easily mounted on the plunger. Moreover, the washer is of thin stock and of non-magnetic material. Upon sliding the washer over the plunger, the detents bend the necessary amount and then spring back when the washer aligns with the groove so that the washer is locked in place at the radial flange 51. Thus, the plunger and stop flange are one-piece, and the washer 53 merely serves to isolate the flange from the face plate to overcome residual magnetism. The operation of this plunger is like that of plunger 13B. However, it can be appreciated that the one-piece plunger and stop flange constructions 13A and 13C would normally have longer life expectancy than the plunger and ring constructions 13 and 13B.

From the foregoing, it can be appreciated that the present invention provides a solenoid that may be quickly and easily assembled and which has a minimum number of parts, but which will give extremely long and reliable life.

It will be understood that modifications and variations may be effected without departing from the scope of the novel concepts of the present invention, but it is understood that this application is to be limited only by the scope of the appended claims.

The invention is hereby claimed as follows:

1. A solenoid comprising a coil tube in the form of a cylindrical sleeve, a plug at one end of said coil tube defined by a cylindrical portion snugly telescopically projecting within said tube and a radial flange portion abutting against the end of said tube, means securing said tube to said cylindrical portion, a face plate at the other end of said tube having an annular portion and a diametrically reduced portion extending from one end of said annular portion, a bore extending through said face plate so that it is snugly telescopically received over said tube, said annular portion defining a radial flange, said tube coacting with said radial flanges to define a coil bobbin, a coil wound on said bobbin, and a plunger slidably received in said tube and movable toward said plug upon energization of said coil.

2. A solenoid comprising a coil tube in the form of a cylindrical sleeve, a plug at one end of said coil tube including a cylindrical portion snugly telescopically projecting within said tube and a radial flange defining a substantially radially extending face abutting against the end of said tube, means securing said tube to said cylindrical portion, a face plate at the other end of said tube having a bore therethrough and being snugly telescopically received over said tube and including an annular portion and a diametrically reduced portion extending from one end of said annular portion wherein said annular portion defines a radial flange having a substantially radially extending face in opposed relation to the radially extending face of said plug, said tube coacting with said faces to define a coil bobbin, a coil wound on said bobbin, a plunger slidably received in said tube and movable toward said plug upon energization of said coil, and a casing in the form of a cylindrical sleeve telescopically received over said coil abutting against a shoulder on one of said flanges and being secured against movement by means coacting with the other flange.

3. A solenoid as defined in claim 2, and insulation means on said tube and against said faces.

4. A solenoid as defined in claim 3, wherein said insulation means includes insulating tape on the tube and insulating washers against said faces.

5. A solenoid as defined in claim 2, wherein said faces are substantially the same radial depth.

6. A solenoid comprising a coil tube in the form of a cylindrical sleeve, a plug at one end of said coil tube defined by a cylindrical portion snugly telescopically projecting within said tube and a radial flange portion abutting against the end of said tube, means securing said tube to said cylindrical portion, a face plate at the other end of said tube having an annular portion and a dimetrically reduced portion extending from one end of said annular portion, a bore extending through said face plate so that it is snugly telescopically received over said tube, said annular portion defining a radial flange, said tube coacting with said radial flanges to define a coil bobbin, a coil wound on said bobbin, a plunger slidably received in said tube and movable toward said plug upon energization of said coil, said coil tube being non-magnetic and said plug, face plate and plunger being magnetic, and non-magnetic means on said plunger for preventing the plunger from bottoming on the plug during energization of said coil.

7. A solenoid as defined in claim 6, wherein said non-magnetic means includes a member radially projecting from said plunger and coacting with said face plate to seat the plunger in energized position so that the plunger is slightly spaced from said plug.

8. A solenoid as defined in claim 2, wherein one end of said tube is staked to said plug and the other end is flared to coact with said face plate and prevent movement of same off said tube, and said cover is staked to said face plate.

9. A solenoid comprising a coil tube in the form of a cylindrical sleeve, a plug at one end of said coil tube including a cylindrical portion snugly telescopically projecting within said tube and a radial flange defining a substantially radially extending face abutting against the end of said tube, means securing said tube to said cylindrical portion, a face plate at the other end of said tube having a bore therethrough and being snugly telescopically received over said tube and including an annular portion and a diametrically reduced portion extending from one end of said annular portion wherein said annular portion defines a radial flange having a substantially radially extending face in opposed relation to the radially extending face of said plug, said tube coacting with said faces to define a coil bobbin, a coil wound on said bobbin, a plunger slidably received in said tube and movable toward said plug upon energization of said coil, a casing in the form of a cylindrical sleeve telescopically received over said coil abutting against a shoulder on one of said flanges and being secured against movement by means coacting with the other flange, a spring bottomed at one end against said face plate, a seating ring on said plunger against which the other end of the spring bottoms and coacting with the plunger when the coil is energized so that the plunger is slightly spaced from said plug, a bore extending through said plug, and a push pin guidably received in said bore and secured to said plunger.

References Cited by the Examiner

UNITED STATES PATENTS

| 2,391,277 | 12/1945 | Stapleton | 317—191 |
| 2,405,396 | 8/1946 | Bazley | 317—191 |
| 3,134,932 | 5/1964 | Ray | 317—186 X |

BERNARD A. GILHEANY, *Primary Examiner.*

G. HARRIS, *Assistant Examiner.*